United States Patent
Yeung (10) Patent No.: US 9,881,405 B2
(45) Date of Patent: Jan. 30, 2018

(54) IMAGE PROCESSOR FOR PRODUCING AN IMAGE ON AN IRREGULAR SURFACE IN A WEARABLE DEVICE

(71) Applicant: Intel Corporation, Santa Clara, CA (US)

(72) Inventor: Fai Yeung, Palo Alto, CA (US)

(73) Assignee: Intel Corporation, Santa Clara, CA (US)

(*) Notice: Subject to any disclaimer, the term of this patent is extended or adjusted under 35 U.S.C. 154(b) by 67 days.

(21) Appl. No.: 14/757,868

(22) Filed: Dec. 23, 2015

(65) Prior Publication Data
US 2017/0186199 A1 Jun. 29, 2017

(51) Int. Cl.
*G06T 11/60* (2006.01)
*G06T 5/00* (2006.01)
*G02B 27/01* (2006.01)

(52) U.S. Cl.
CPC ............ *G06T 11/60* (2013.01); *G02B 27/017* (2013.01); *G06T 5/006* (2013.01); *G02B 2027/0178* (2013.01)

(58) Field of Classification Search
None
See application file for complete search history.

(56) References Cited

U.S. PATENT DOCUMENTS

| 9,064,309 | B2 | 6/2015 | Chaudhury et al. |
| 2005/0134599 | A1 | 6/2005 | Nayar et al. |
| 2010/0245684 | A1 | 9/2010 | Xiao et al. |
| 2014/0168368 | A1 | 6/2014 | Doucet et al. |
| 2014/0204083 | A1* | 7/2014 | Thomson ............. G06T 5/006 345/420 |
| 2015/0153164 | A1 | 6/2015 | Klass |
| 2015/0177906 | A1 | 6/2015 | Yairi et al. |

FOREIGN PATENT DOCUMENTS

WO    WO-2017112121 A1    6/2017

OTHER PUBLICATIONS

"International Application Serial No. PCT/US2016/061376, Written Opinion dated Feb. 20, 2017", 5 pgs.

Prasad, Dilip K., et al., "Online tracking of deformable objects under occlusion", J. Opt. Soc. Am. A / vol. 30, No. 8, [Online]. Retrieved from the Internet: <http://docslide.net/download/link/on-line-tracking-of-deformable-objects-under-occlusion-using-dominant-points>, (Aug. 2013), 1484-1491.

* cited by examiner

*Primary Examiner* — Vu Nguyen
(74) *Attorney, Agent, or Firm* — Schwegman Lundberg & Woessner, P.A.

(57) ABSTRACT

Solutions for producing an image on an irregular surface are described. A graphical object is identified from an image to be displayed on the irregular surface. Objects according to at least one shape function are distorted to compensate for irregularities in the irregular surface. Previously-distorted instances of objects may be added to a distortion-compensated image.

26 Claims, 10 Drawing Sheets

IMAGE PROCESSOR FOR PRODUCING AN IMAGE ON AN IRREGULAR SURFACE IN A WEARABLE DEVICE

TECHNICAL FIELD

Embodiments described herein generally relate to an image processor and, more particularly, to an image processor to process graphical information for display on a surface having variable curvature, such as a smart glasses display.

BACKGROUND

The graphics rendering system in smart glasses may attempt to compensate for the curvature of lens before displaying an image on the lens. Without this compensation an image may appear to be distorted on smart glasses.

In a typical design, the processor (which may be local to the smart glasses, or remotely located, such as in the cloud, or in a companion smartphone, performs the computationally-intensive distortion compensation. In cases where the compensation processor is remote, its output, the distortion-compensated image, is sent to the smart glasses. This remote-based processing has been relocated to the remote compensation processor in the companion phone, or elsewhere, because the local computing capability on the smart glasses tends to be limited by comparison. Still, the compensation for distortion is not a trivial computational problem even for the companion phone.

Previous solutions for distortion compensation involve direct pixel interpolation of the entire image via linear transforms such as perspective transform. While perspective transform may reasonably describe linear space, it may not fit the curvature of the lens very well because the lens requires higher order of description for its curved surface.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Aspects of the embodiments are directed to distortion compensation for images to be displayed on a curved surface. While conventional approaches, such as those summarized above, for instance, operate on all pixels of the image each time the display is refreshed, some of the present embodiments recognize that this conventional brute-force approach is unnecessary because, instead of the entire image, only some visual elements may be subject to updating. For example, while an on-screen clock updates the time, the rest of screen elements such as location, upcoming calendar appointment, etc. remain unchanged.

In some embodiments, screen rendering is computed based on a deformable mesh. Accordingly, the visual content is modeled as deformable objects with specific deformation characteristics. In some examples, the deformation associated with each object may be described by the shape function of a Lagrange element representing the object. Each Lagrange element represents a second-order non-rigid surface. As a result, this type of modeling of deformation fits the distortion of the lens more preciously than linear models using affine or perspective transform, for example.

In related embodiments, deformable objects are updated independently. Advantageously, the update of an object avoids having to compute updates of the entire image, thus significantly reducing the overall computational load.

Figure 1:
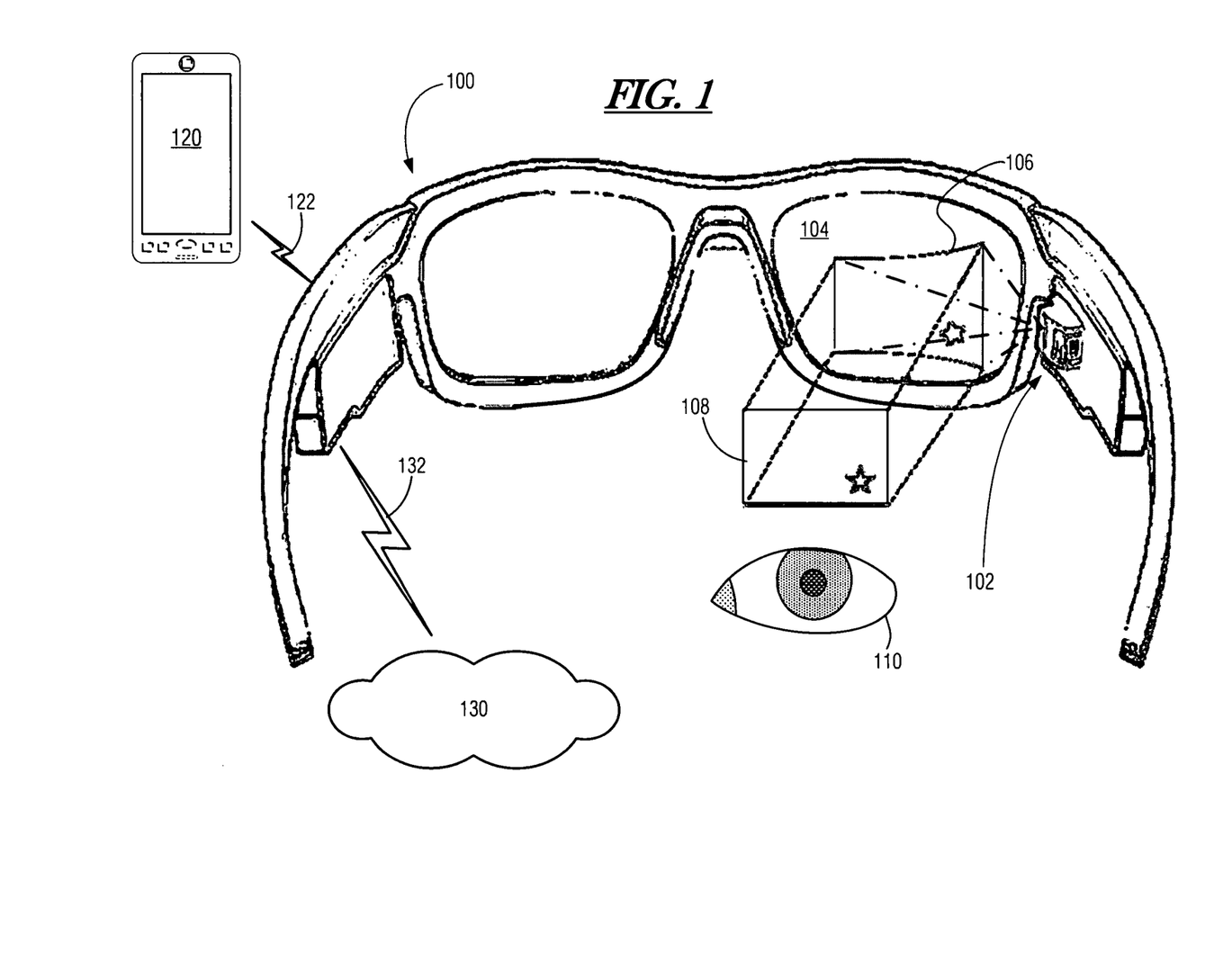
FIG. 1 is a diagram illustrating the general operation of displaying an image onto the lens of a pair of smart glasses, as well as optional distributed processing devices that may work with the smart glasses according to some embodiments.

FIG. 1 is a diagram illustrating the general operation of displaying of an image onto the lens of a pair of smart glasses 100 according to some embodiments. As depicted, smart glasses 100 include a display projector 102 that projects an image onto an interior surface 104 of the lens. Interior surface 104 has a complex shape that includes varying degrees of curvature. Image 106 is projected by display projector 102 onto lens surface 104 in a distortion-compensated format, as illustrated, to be perceived by the user 110 as a non-distorted image 108.

It should be noted that smart glasses 100 may take a variety of different form factors, and may generally include various other components, including computing hardware, power circuitry, user input and various sensing/data capture devices, such as a camera, microphone, touch sensor, etc., as well as wireless networking interface devices, and the like, some of which are described in greater detail below.

Smart glasses 100 may include a wireless interface for communicating with a companion smartphone 120 via wireless link 122. For instance, a Bluetooth Low-Energy (BLE) connection may be supported. In some related embodiments, smart glasses 100 and companion smartphone 120 may use distributed computing techniques to off-load certain computing operations to smartphone 120, which generally has more computing capacity and battery capacity than smart glasses 100. In other embodiments, smart glasses 100 may connect wirelessly to remote service 130, which may be a cloud-based computing model, via wireless link 132. Wireless link 132 may be wireless to a base station, such as a Wi-Fi base station, or a Long-Term Evolution (LTE) e-node B (neither of which is shown for the sake of clarity), which in turn connects to service provider 130 via a backhaul or Internet service provider's wide-area network (WAN).

Figure 2:
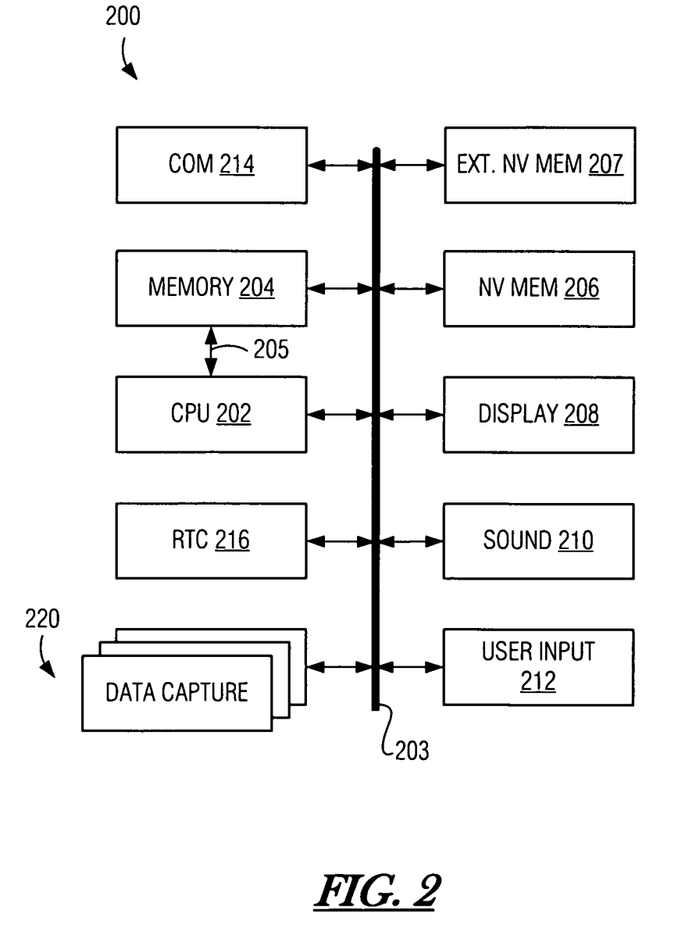
FIG. 2 is a block diagram illustrating an exemplary system architecture of a computing device, such as one or more of the computing devices depicted in FIG. 1, according to an embodiment.

FIG. 2 is a block diagram illustrating an exemplary system architecture 200 of smart glasses 100 or smartphone 120, each of which may generally be considered a computing device. Depending on the form factor and nature of the smart glasses 100 or smartphone 120 computing devices, not every component described below may be present. Central processor unit (CPU) 202 includes one or more microprocessors on which the overall functionality of computing device 100 is executed. CPU 202 is formed from hardware that is electrically interfaced with system link 203, which carries data and control signaling between the various components. As illustrated, system link 203 is similarly interfaced with each of the other components of system architecture 200. Memory 204 includes working memory space, and is constructed from suitable high-speed memory devices such as synchronous dynamic random access memory (SDRAM). In the embodiment illustrated, CPU 202 may access memory 204 using high-speed interface 205. Non-volatile memory 206 is constructed using read-only memory (ROM), electrically-erasable programmable read-only memory (EEPROM), flash memory or other suitable non-volatile storage technology. Non-volatile memory 206 stores system and application software that is executed by CPU 202 and, in some cases, by processors present in one or more other components.

External non-volatile memory 207, where available, includes an interface such as a secure digital (SD) card slot, which may accept removable storage media to be used as additional non-volatile data storage.

Display 208 includes display 104 and circuitry for interfacing the display 104 with the system, as well as video driving circuitry and, in the case of smart glasses 100, a display projection device. Sound 210 contains circuitry for driving the audio output to a speaker or headphones, and the circuitry for interfacing with the system. User input 212 contains the circuitry for interfacing with input devices such as a tapping gesture sensor or touchscreen input device. Communications block 214 represents communications circuitry and circuitry for interfacing the communications circuitry with the system. Communications block 214 may include a radio for communicating over a cellular network such as a network designed according to the LTE, LTE-Advanced, 5G or Global System for Mobile Communications (GSM) families of standards. Also, communications circuitry 214 may include a Wi-Fi communications radio according to the IEEE 801.11 family of standards, or a Bluetooth radio circuit according to the IEEE 802.15 family of standards. Real-time clock 216 includes circuitry that provides a clock that maintains the current date and time, and that interfaces the clock to the system.

Data capture devices 220 are integrated with computing device 200. According to various embodiments, data capture devices 220 include a plurality of different types of sensing transducers and their associated processing and interface circuitry, such as a accelerometer 110, as well as a camera, GPS, and biometric sensors according to various embodiments.

The processing circuitry associated with each corresponding transducer may include amplification, buffering, filtering, or other signal-conditioning circuitry to receive the raw analog signal from the corresponding transducer and prepare the analog signaling for digitization, analog-to-digital conversion circuitry to perform sampling, quantization, and digital encoding, and, in some cases, further processing to produce a digital signal representing the physical phenomenon being measured by the transducer in a form that is readable by CPU 202.

Figure 3:
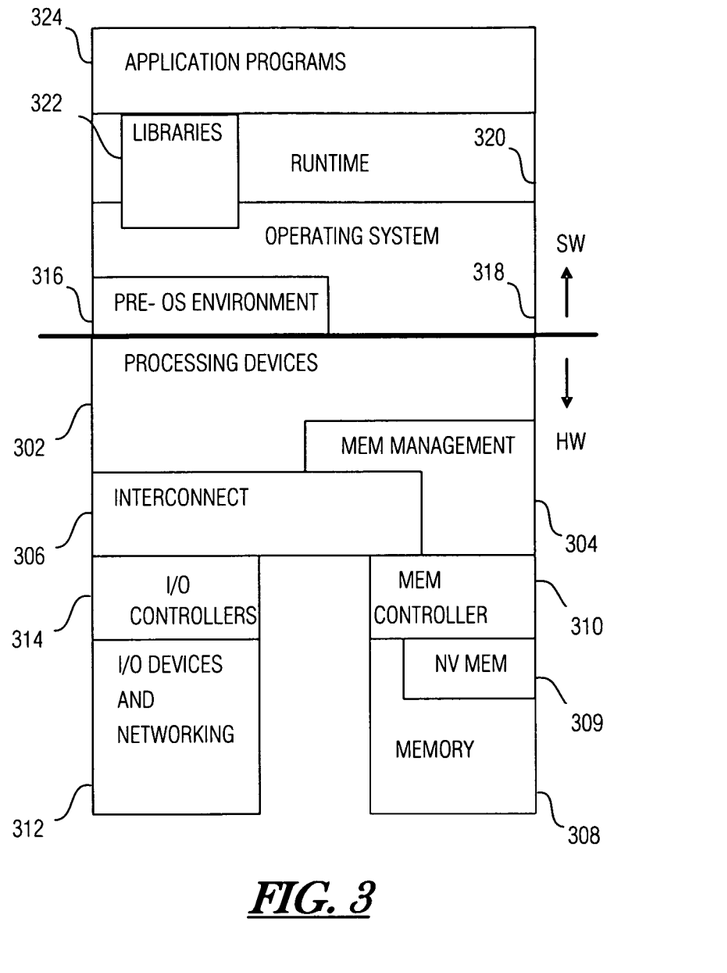
FIG. 3 is a diagram illustrating an exemplary hardware and software architecture of a computing device such as the one depicted in FIG. 2, in which various interfaces between hardware components and software components are shown.

FIG. 3 is a diagram illustrating an exemplary hardware and software architecture of a computing device such as the one depicted in FIG. 2, in which various interfaces between hardware components and software components are shown. As indicated by HW, hardware components are represented below the divider line, whereas software components denoted by SW reside above the divider line. On the hardware side, processing devices 302 (which may include one or more microprocessors, digital signal processors, etc., each having one or more processor cores, are interfaced with memory management device 304 and system interconnect 306. Memory management device 304 provides mappings between virtual memory used by processes being executed, and the physical memory. Memory management device 304 may be an integral part of a central processing unit which also includes the processing devices 302.

Interconnect 306 includes a backplane such as memory, data, and control lines, as well as the interface with input/output devices, e.g., proprietary bus, PCI, USB, etc. Memory 308 (e.g., dynamic random access memory—DRAM) and non-volatile memory 309 such as flash memory (e.g., electrically-erasable read-only memory—EEPROM, NAND Flash, NOR Flash, etc.) are interfaced with memory management device 304 and interconnect 306 via memory controller 310. This architecture may support direct memory access (DMA) by peripherals in some embodiments. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 312, which interface with interconnect 306 via corresponding I/O controllers 314.

On the software side, a pre-operating system (pre-OS) environment 316, which is executed at initial system start-up and is responsible for initiating the boot-up of the operating system. One traditional example of pre-OS environment 316 is a system basic input/output system (BIOS). In present-day systems, a unified extensible firmware interface (UEFI) may be implemented. Operating system (OS) 318 provides a kernel that controls the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 318 provides device drivers, and a variety of common services such as those that facilitate interfacing with peripherals and networking, that provide abstraction for application programs so that the applications do not need to be responsible for handling the details of such common operations. Operating system 318 additionally provides a graphical user interface (GUI) that facilitates interaction with the display, sound, and touch and motion input devices.

Runtime system 320 implements portions of an execution model, including such operations as putting parameters onto the stack before a function call, the behavior of long-term storage input/output (I/O), and parallel execution-related behaviors. Runtime system 320 may also perform support services such as type checking, debugging, or code generation and optimization.

Libraries 322 include collections of program functions that provide further abstraction for application programs. These include shared libraries, dynamic linked libraries (DLLs), for example. Libraries 322 may be integral to the operating system 318, runtime system 320, or may be added-on features, or even remotely-hosted. Libraries 322 define an application program interface (API) through which a variety of function calls may be made by application programs 324 to invoke the services provided by the operating system 318. Application programs 324, oftentimes referred to as apps, are those programs that perform useful tasks for users, beyond the tasks performed by lower-level system programs that coordinate the basis operability of the computing device itself.

Examples, as described herein, may include, or may operate on, logic or a number of components, modules, or engines, which for the sake of consistency are termed modules, although it will be understood that these terms may be used interchangeably. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module.

In various examples, modules may be formed from circuitry of one or more general-purpose processors, one or more dedicated graphics processors, one or more ASICs, or other hardware circuitry, which may be entirely hard-wired, or may be programmable by program instructions that, when executed on underlying processing hardware, form one or more modules.

In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. With reference to FIG. 3, for instance, a module may include one, or any combination, of the blocks depicted, so long as at least one block from the HW side is included.

Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time.

Figure 4:
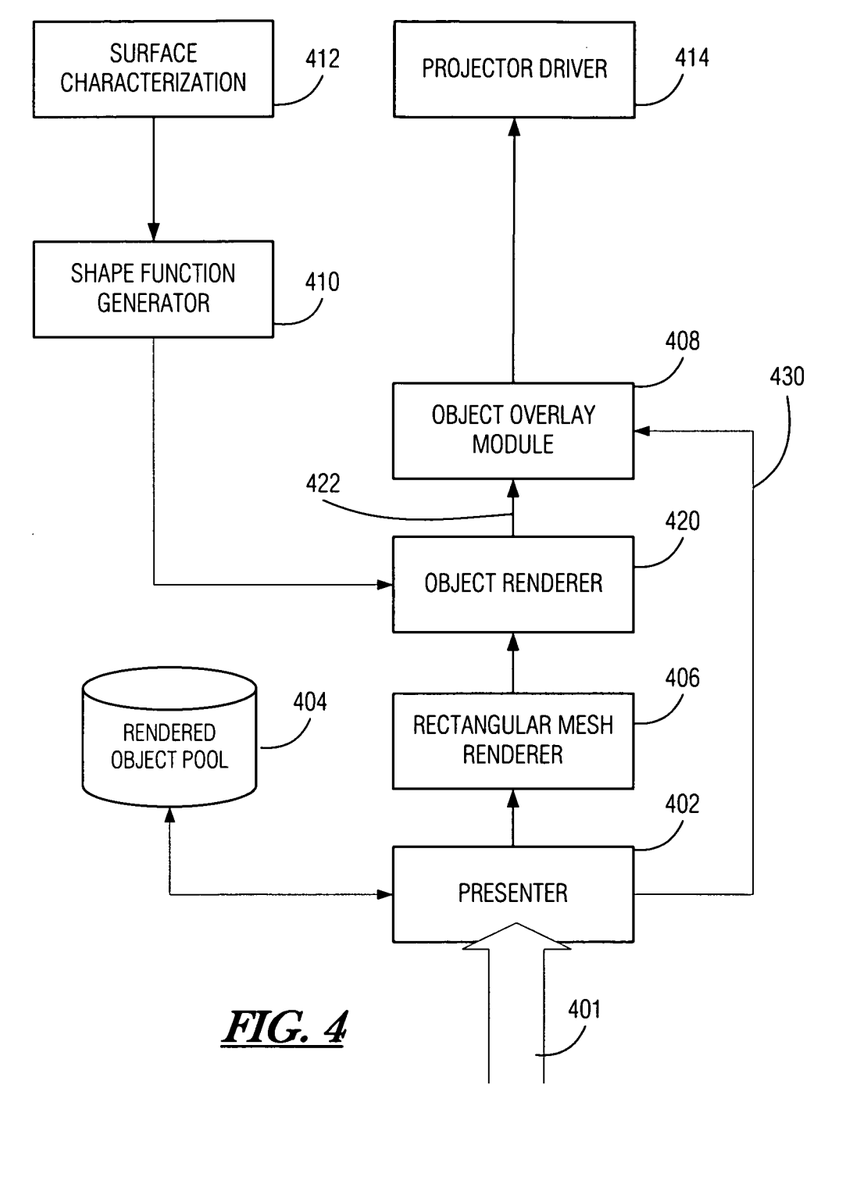
FIG. 4 is a system block diagram illustrating a system for rendering objects to be displayed on an irregular surface according to some embodiments.

FIG. 4 is a system block diagram illustrating a system for rendering objects from an image 401 to be displayed on an irregular surface according to some embodiments. Presenter module 402 is configured with hardware and software components, and operative to identify graphical objects to be displayed from the image 401, and to determine if an object to be displayed is to be newly processed to be rendered and deformed, or whether a suitable previously-processed instance of the object may be reused.

Image 401 may be identified by presenter module 402 as a sprite with an alpha channel. The alpha channel of image 401 maps out the shape of a sprite object. In the absence of an alpha channel, presenter module 402 may identify a graphical object as a raster image and the bounding box of the graphical object may be the rectangular frame of the raster image. For example, a raster image may be added to the rectangular mesh renderer 406 as a background raster image. Next, a text object or sprite may be passed to rectangular mesh renderer 406 and overlaid with the background raster image. Because the graphical object (e.g., the sprite or text) is handled separately from the background part of the image, it may be re-positioned, or removed, by presenter module 402 at a later point in time.

According to some embodiments, rectangular mesh renderer module 406 is configured with hardware and software components, and operative to computationally represent objects on a rectangular mesh composed of individual deformable elements. Object renderer module 420 is configured with hardware and software components, and operative to apply a forward transformation of an object represented with a rectangular mesh, into a deformed mesh based on one or more shape functions produced by shape function generator 410.

Object overlay module 408 is configured with hardware and software components, and operative to overlay certain previously-deformed objects to the deformed mesh produced by object renderer module 420.

Surface characterization module 412 is configured with hardware and software components, and operative to produce a representation of the curvature and other geometric features of an irregular surface (e.g., surface 104), from which shape function generator 410 may generate a series of shape functions.

The shape functions, which are described below in greater detail, implement object deformation by variation of mesh shapes onto which objects are mapped.

Projector driver module 414 is configured with hardware and software components, and operative to produce a video display signal representing the deformed screen image to be displayed onto surface 104 based on the output of object renderer module 420, and object overlay module 408.

In some embodiments, the graphics rendering for smart glasses 100 is partitioned into the processing of graphics elements on two distinct surfaces: (1) a rectangular mesh of regular elements, called a Lagrange parent elements $K_m$; and (2) a deformable mesh of irregular elements, called Lagrange elements $D_m$. The Lagrange parent element $K_m$ is a rectangular rendering element on a surface that is independent of the rendering surface 104 of glasses 100 and fits well into the Cartesian coordinate system. The irregular Lagrange element $D_m$, in contrast, is dependent on the curvature of the surface 104 of smart glasses 100. This partitioning helps to separate the composition of visual elements/objects (i.e., content) from the pixel interpolation during rendering.

In related embodiments, the partitioning creates glasses/device independent rendering space for graphics composition so that the routines for graphics manipulation and processing may be portable across different glasses and wearable products. In additional related embodiments, the partitioning supports focusing on performance optimization for the space transform in mapping graphics elements from the regular rectangular space to high-order non-rigid space represented by the deformable mesh. For example, Single-Instruction-Multiple-Data (SIMD) performance optimization may be employed in certain embodiments.

In a related embodiment, presenter module 402 queries for previously-rendered deformable objects, e.g., a logo at a fixed position, which have been rendered previously and cached in rendered object pool 404.

Figure 5:
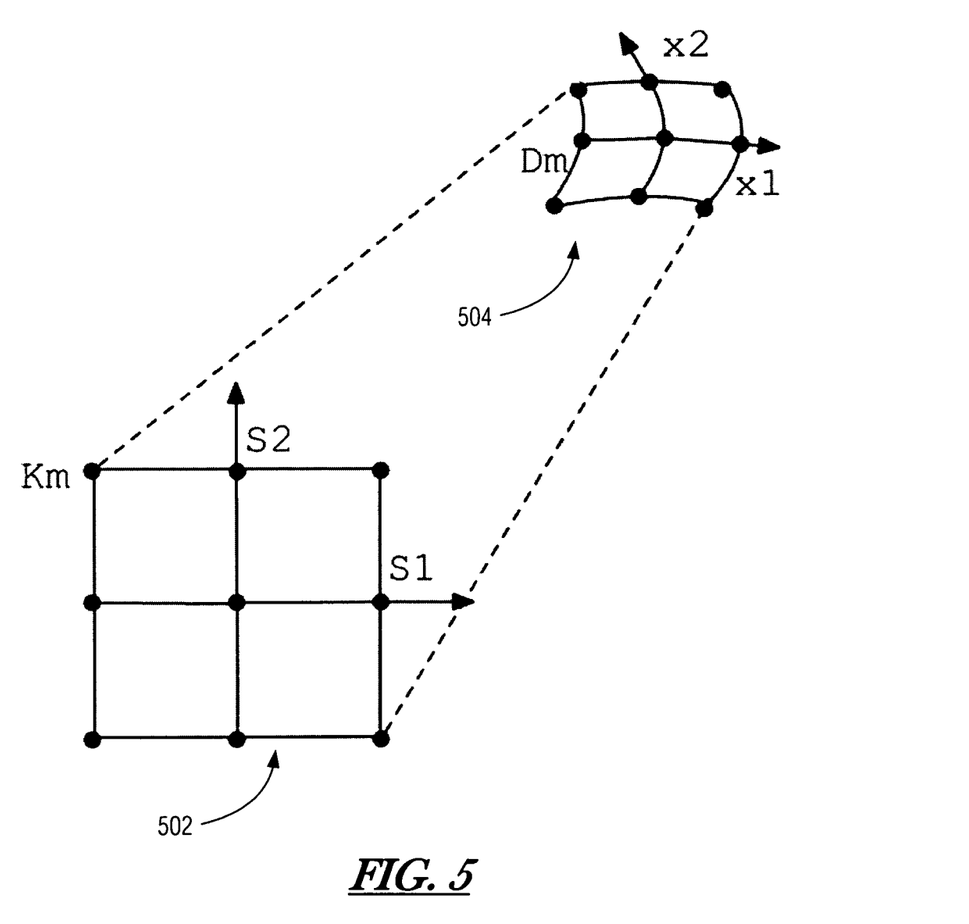
FIG. 5 is a diagram illustrating a transformation of a Lagrange parent element to an irregular Lagrange element according to some embodiments.
Figure 6:
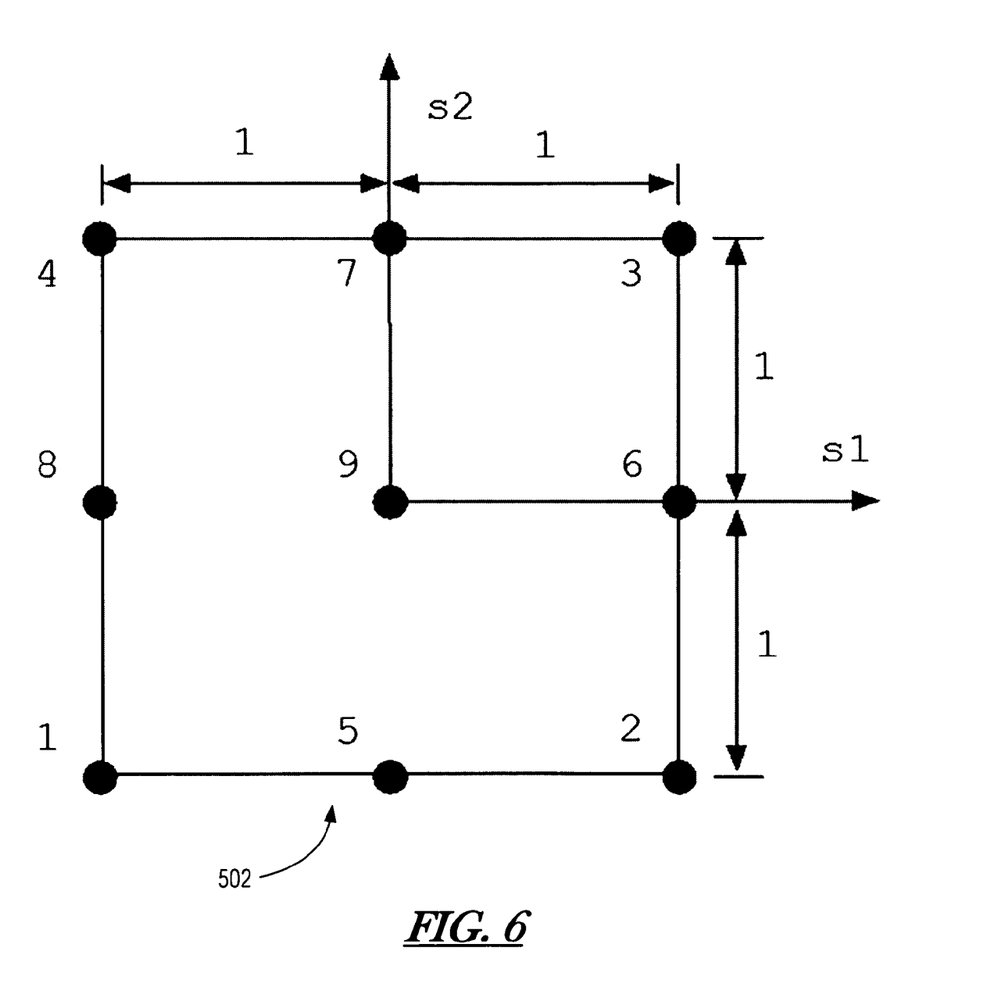
FIGS. 6 and 7 are a diagrams illustrating a Lagrange parent element, which may be discretized according to some embodiments.

FIG. 5 is a diagram illustrating a transformation of a Lagrange parent element to an irregular Lagrange element according to some embodiments. In an example embodiment, the basis element used in the rendering system is a nine-node Lagrange element, as depicted in FIG. 6. In this example, the parent element $K_m$ 502 is a regularly-shaped rectangle, which becomes irregular deformed shape $D_m$ 504 after distortion.

Figure 7:
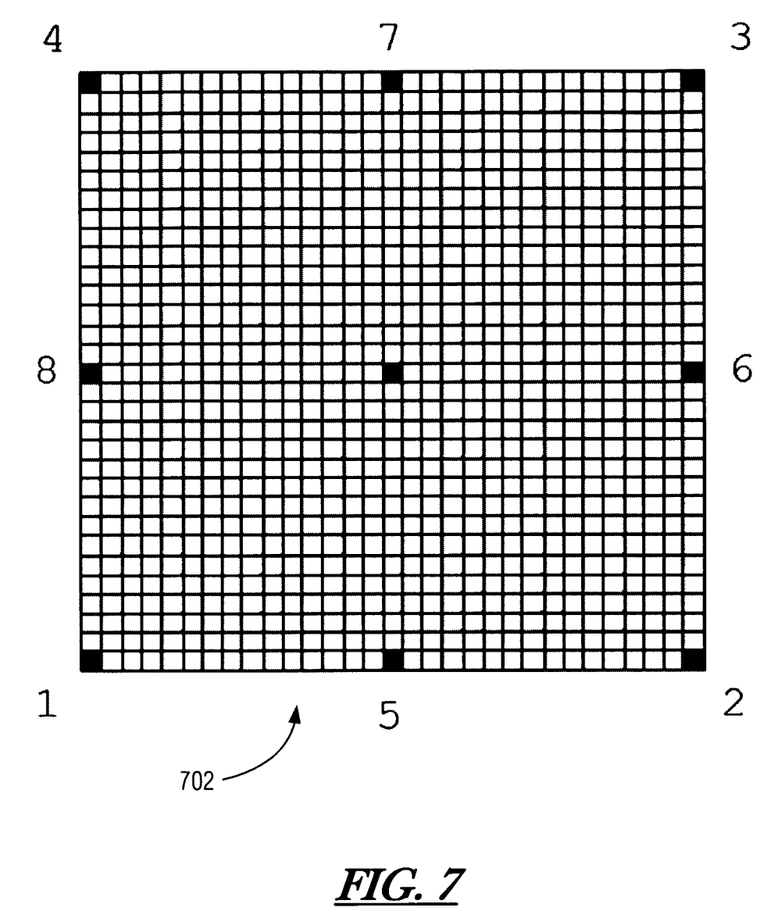

FIGS. 6 and 7 are a diagrams illustrating a Lagrange parent element, which may be discretized according to some embodiments. In FIG. 6, parent element $K_m$ 502 is a nine-node element. FIG. 7 illustrates a result of resampling of the width and height of parent element $K_m$ 502 at a sampling interval of 1/15, producing a canvas of size 41 by 41 pixels, as indicated at 702.

Shape function generator module 410 produces shape functions that describe the deformation for $D_m$ 504. The function within Lagrange element may be interpolated from its nodal values using the shape function. As an illustrative example, the shape function of a nine-node Lagrange element, such as element 502, is given by:

$$N_1 = \frac{1}{4}(1-s_1)(1-s_2) - \frac{1}{2}N_5 - \frac{1}{2}N_8 + \frac{1}{4}N_9$$

$$N_2 = \frac{1}{4}(1+s_1)(1-s_2) - \frac{1}{2}N_5 - \frac{1}{2}N_6 + \frac{1}{4}N_9$$

$$N_3 = \frac{1}{4}(1+s_1)(1+s_2) - \frac{1}{2}N_6 - \frac{1}{2}N_7 + \frac{1}{4}N_9$$

$$N_4 = \frac{1}{4}(1-s_1)(1+s_2) - \frac{1}{2}N_7 - \frac{1}{2}N_8 + \frac{1}{4}N_9$$

$$N_5 = \frac{1}{2}(1-s_1^2)(1-s_2) - \frac{1}{2}N_9$$

$$N_6 = \frac{1}{2}(1+s_1)(1-s_2^2) - \frac{1}{2}N_9$$

$$N_7 = \frac{1}{2}(1-s_1^2)(1+s_2) - \frac{1}{2}N_9$$

$$N_8 = \frac{1}{2}(1-s_1)(1-s_2^2) - \frac{1}{2}N_9$$

$$N_9 = (1-s_1^2)(1-s_2^2).$$

In the above example equations, variables $s_1$ and $s_2$ are intrinsic coordinates in the parent element $K_m$. The shape function has a value of unity at the node to which it is related. It also has the property that the sum at any point within an element is equal to unity.

The effectiveness of any particular element type may depend on how well the shape function is capable of representing the local curvature of the surface 104 of smart glasses 100. In some embodiments, shape function generator 410 is capable of representing second-order of curvature so it gives the description of lens curvature in high precision.

In order to facilitate reuse of previously-rendered visual objects, some embodiments use locality-sensitive hashing (LSH) to reduce the dimensionality of shape function data. For example, the shape function for each mesh element may be reduced to one of the 10 representative sets of shape functions. Each representative shape function is associated with a hash value from 0 to 9, in an example.

Figure 8:
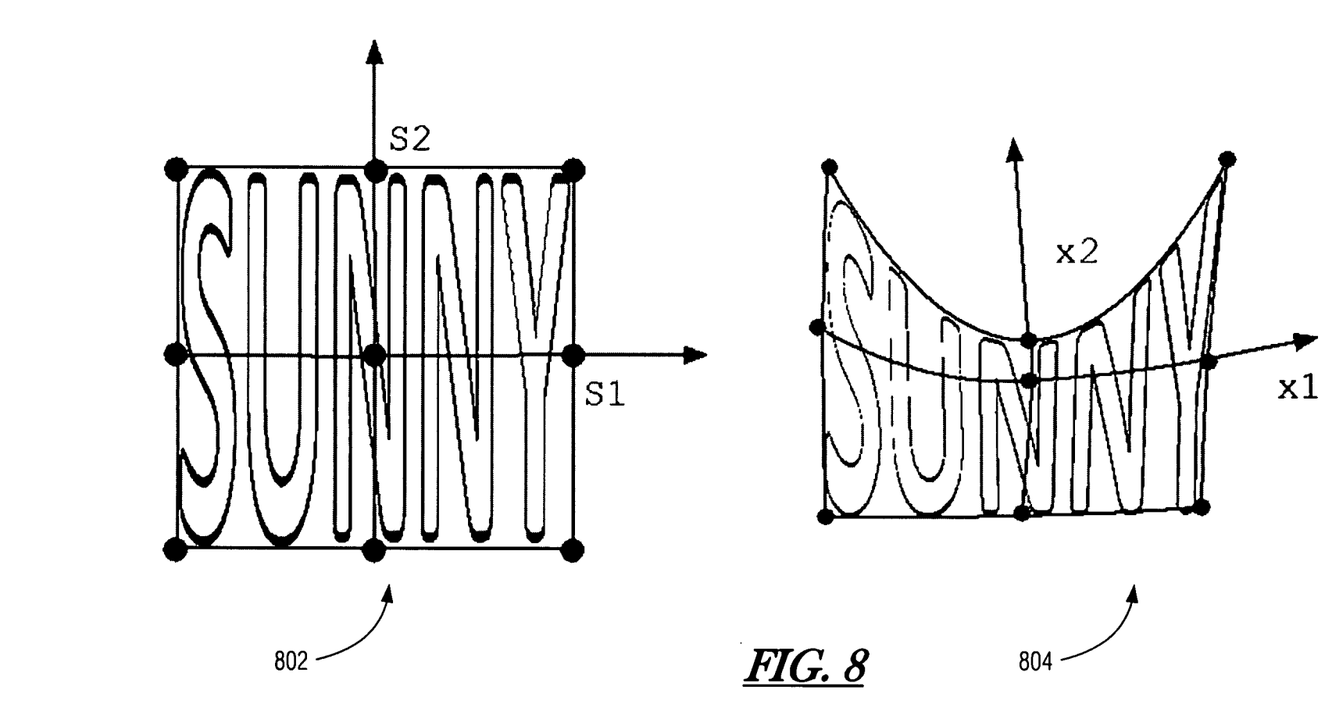
FIG. 8 illustrates an example of a transformation of a textual object according to some embodiments.

FIG. 8 illustrates an example of a transformation of a textual object according to some embodiments. As indicated at 802, the visual object, which in the present example is the word "SUNNY" having a regular shape, is transformed according to the shape function based on the above equations, into deformable object 804, which is based on the object's intrinsic shape, as modified by the applied deformation.

In some embodiments, each deformable object is associated with one shape function only (or a single hash value of shape functions in embodiments using the caching technique with rendered object pool 404). If the distortion of the visual object is too great, the visual object will be broken down into two or more deformable objects. In the present example, the single word "SUNNY" may be broken into a first part, "SU" and a second part, "NNY." In a related embodiment, this problem may be solved with the use of multiple deformable objects to represent the visual object, e.g., "SUNNY" if the extent of distortion where "SUNNY" is rendered cannot be accurately represented by one single shape function. This may be computationally determined by an assessment of degree of distortion, and comparing that assessment against a defined distortion threshold.

Figure 9:
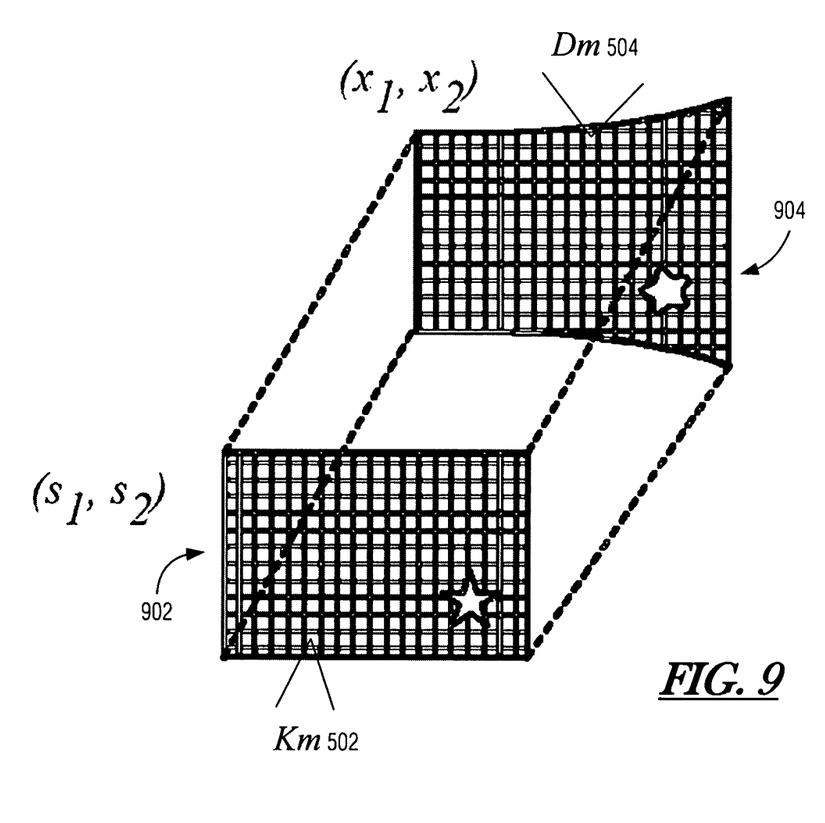
FIG. 9 is a diagram illustrating a process of modeling the visual objects to be displayed using a deformable mesh according to some embodiments.

FIG. 9 is a diagram illustrating a process of modeling the visual objects to be displayed using a deformable mesh according to some embodiments. As depicted, mesh 902 is a rectangular mesh composed of a plurality of Lagrange parent elements, denoted by $K_m$ 502. Each parent element $K_m$ 502 is designed to approximate a function over a continuous domain.

In the example embodiment depicted, deformed mesh 904 of irregular elements $D_m$ 504 is treated as being deformed from the parent element's mesh having regular parent elements $K_m$ 502. The deformation represents the compensation for lens distortion for projected visual objects.

In a related embodiment, coordinates may be interpolated from the nodal values using the same shape function. For instance, as illustrated in FIG. 9, coordinates $x_1$ and $x_2$ within an irregular element $D_m$ 504 are defined by:

$$x_1 = \Sigma_{i=1}^9 N_i s_1(i) \text{ and } x_2 = \Sigma_{i=1}^9 N_i s_2(i).$$

By employing this coordinate mapping function, this embodiment may uniquely identify the coordinates $(x_1, x_2)$ on the lens surface 104 of glasses 100 where the pixel value corresponding to the rectangular parent element at coordinates $(s_1, s_2)$ may be placed.

In some embodiments, a one-time surface characterization may be performed to compute the shape function 410 for each element in deformable mesh 902. The shape function 410 may be derived by identifying the placement of the nine nodal positions on lens surface 104. The surface characterization operations may be performed at the manufacturer's factory and the shape function 410 may be common for glasses 100 if the same lens and the same projector 102 and projection arrangement (e.g., projector 102 position relative to the lens surface 104) are used.

In a related embodiment, the shape functions 410 for different display locations are different if the underlying lens curvature varies significantly (e.g., beyond a threshold). For example, if there is more than one location for displaying a screen on the lens surface 104, each location may be associated with a corresponding shape function because the curvatures on different part of lens may vary.

In some embodiments, object renderer 420 is configured with hardware and software components, and operative to transform a rectangular mesh (e.g., mesh 902) into a deformed mesh (e.g., mesh 904) using the shape functions 410 received from surface characterization module 412.

TABLE 1

| Deformable Object # | Shape Function Hash | Description | Memory Address |
|---|---|---|---|
| 1 | 4 | Logo 'Star' | 0x3E13A44D |
| 2 | 6 | Letter 'A' | 0x3E12B35E |
| 3 | 7 | Word 'SUNNY' | 0x3E22A44A |
| 4 | 6 | Letter 'B' | 0x3E12B36D |
| 5 | 6 | Letter 'C' | 0x3E12B37E |

In order to reduce the overall computational load for this operation, some embodiments reuse previously-rendered deformable objects when matching objects are found in rendered object pool 404. Table 1 represents an example database of rendered object pool 404 according to an embodiment. To find a matching object, a query of rendered object pool 404 seeks matches of both, the shape function hash value, and a description, of the object of interest.

For example, with reference to Table 1 above, to carry out the task of rendering the text string "ABC" for display according to a shape function that has a shape function hash value of 6, deformable objects 2, 4 and 5 are found to be matching objects. Instead of computing the deformed objects ABC again, presenter module 402 simply fetches the deformable objects 2, 4 and 5 from the rendered object pool 404, in this case, those objects located at memory addresses 0x3E12B35E, 0x3E12B36D and 0x3E12B37E.

Figure 10:
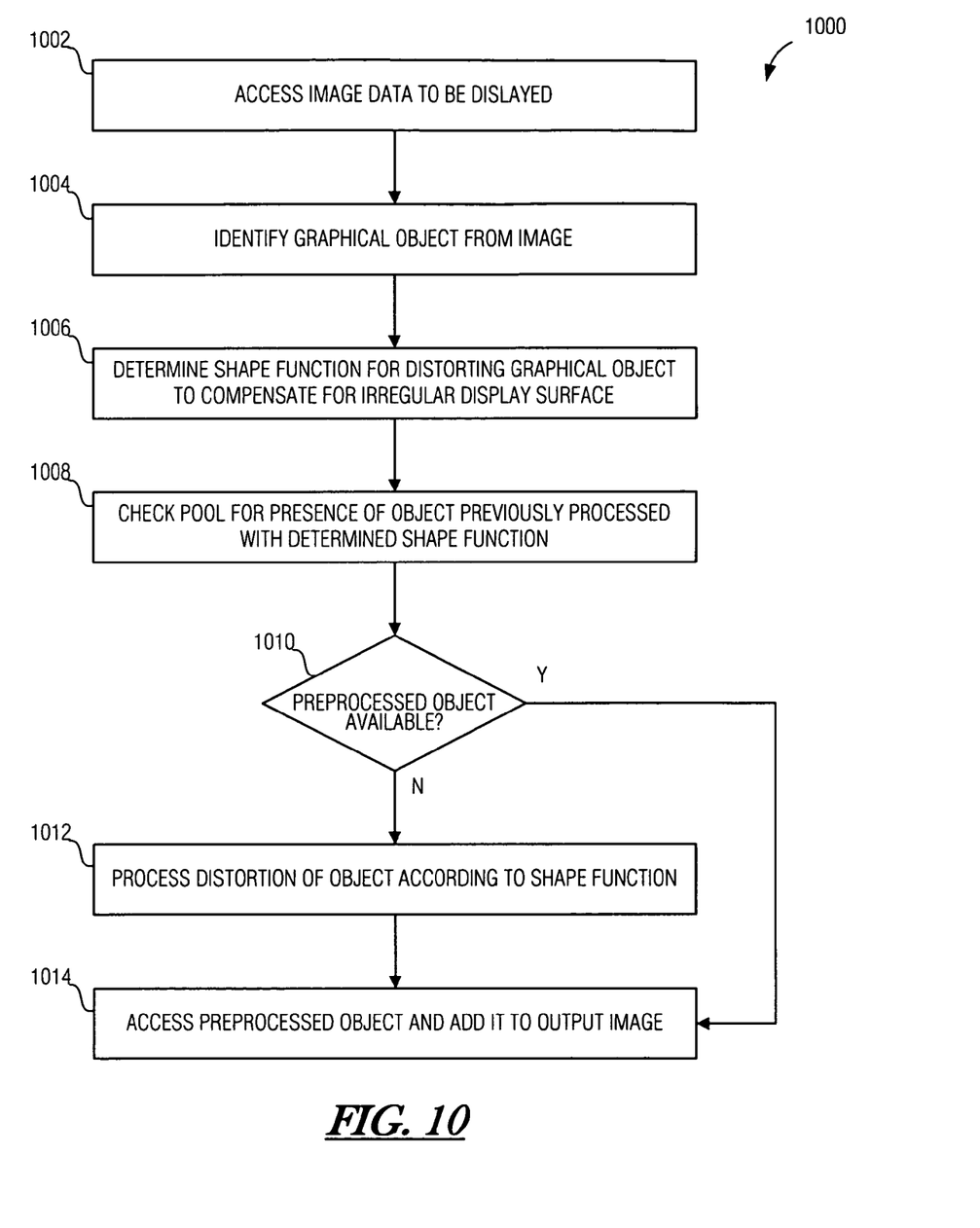
FIG. 10 is a flow diagram illustrating an example of a process to correct an image for display on a surface having an irregular geometry according to some embodiments.

FIG. 10 is a flow diagram illustrating an example of a process 1000 to correct an image for display on a surface having an irregular geometry according to some embodiments. Example process 1000 may be performed by the system of FIG. 4, or by a system having a different architecture. Notably, process 1000 is a machine-implemented process that operates autonomously (e.g., without user interaction), though the operation of the process may be user initiated, or automatically initiated. In addition, it is important to note that process 1000 is an embodiment that may be realized as described; in addition, portions of the process may be implemented while others are omitted in various embodiments. The following Additional Notes and Examples section details various combinations, without limitation, that are contemplated. It should also be noted that in various embodiments, certain process operations may be performed in a different ordering than depicted in FIG. 10.

At 1002, image data to be displayed is accessed. In various embodiments, the image prominently features iconic or textual information. At 1004, particular graphical objects are identified. These may be letters, words, icons, sprites, or, more generally, contrasting shapes with identifiable edges or boundaries. In related embodiments, a plurality of distinct objects may be identified from each single image.

At 1006, based on the location of the graphical object within the display image, a shape function for distorting the object is determined. This determination may be computationally achieved via a lookup operation that reads a table which maps various locations to corresponding shape functions (which have been previously determined in a surface characterization operation. Accordingly, in some embodiments, a deformable object is defined as a distortion-compensated graphical object. The deformable object may be derived from the original graphical object by putting the original visual object in the framework of a Lagrange parent element and applying forward transformation via the applicable shape function. This processing operation may be performed at operation 1012. Notably, the processing is resource-intensive.

In a related embodiment, prior to initiating processing to transform the graphical object into a distorted version of itself, operation 1008 checks if the same object has been previously processed with the determined shape function. According to decision 1010, if a preprocessed object is not available, operation 1012 performs the shape distortion processing according to the shape function. Otherwise, if the preprocessed object is available, the process branches to operation 1014, which accesses the preprocessed object, and adds it to the output image.

Additional Notes & Examples

Example 1 is a system for producing an image on an irregular surface, the system comprising: a presenter module to identify a graphical object from an image to be displayed on the irregular surface; an object renderer module to distort objects according to at least one shape function, wherein distortion of the objects compensates for irregularities in the irregular surface; and an object overlay module to add previously-distorted instances of objects to a distortion-compensated image; wherein the presenter module is further to determine whether the graphical object is to be processed by the object renderer module prior to being processed by the object overlay module In Example 2, the subject matter of Example 1 optionally includes, further comprising: computing hardware, including a processor, a data store, and input/output facilities, data store containing instructions that, when executed, cause the computing hardware to implement the presenter module, the object renderer module, and the object overlay module.

In Example 3, the subject matter of any one or more of Examples 1-2 optionally include, wherein at least one of the presenter module, the object renderer module, and the object overlay module, is implemented in hard-wired logic.

In Example 4, the subject matter of any one or more of Examples 1-3 optionally include, further comprising: a rectangular mesh renderer module to computationally represent objects on a rectangular mesh composed of individual deformable elements, wherein the presenter module is to pass the graphical object to the rectangular mesh renderer module.

In Example 5, the subject matter of Example 4 optionally includes, wherein the individual deformable elements are Lagrange parent elements.

In Example 6, the subject matter of any one or more of Examples 4-5 optionally include, wherein the object renderer module is to transform at least some of the individual deformable elements into irregular Lagrange elements based on application of at least one shape function.

In Example 7, the subject matter of any one or more of Examples 1-6 optionally include, further comprising: a rendered object pool that includes a database of the previously-distorted instances of objects, the rendered object pool being responsive to queries identifying original objects and type of distortion applied to those original objects.

In Example 8, the subject matter of Example 7 optionally includes, wherein the rendered object pool is to store hashes of shape functions in association with objects to which those shape functions have been applied to distort those objects.

In Example 9, the subject matter of any one or more of Examples 1-8 optionally include, wherein the object renderer module is to apply a plurality of different shape functions to the graphical object, the plurality of different shape functions corresponding to a plurality of different positions for the graphical object to be displayed on the irregular surface.

In Example 10, the subject matter of any one or more of Examples 1-9 optionally include, wherein the object renderer module is to divide the graphical object into a plurality of graphical objects in response to a degree of applied distortion exceeding a defined threshold.

In Example 11, the subject matter of any one or more of Examples 1-10 optionally include, wherein the object renderer module is to apply a shape function to the graphical object that is at least a second-order shape function.

In Example 12, the subject matter of any one or more of Examples 1-11 optionally include, wherein the system further comprises a display projector arranged to project the image onto the irregular surface.

In Example 13, the subject matter of any one or more of Examples 1-12 optionally include, wherein the system is incorporated as part of a wearable computing device.

In Example 14, the subject matter of any one or more of Examples 1-13 optionally include, wherein the system is incorporated as part of a smartphone.

In Example 15, the subject matter of any one or more of Examples 1-14 optionally include, wherein the system is operative to be communicatively coupled to a remote computing device that includes a display projector arranged to project the image onto the irregular surface.

Example 16 is a method for producing an image on an irregular surface, the method comprising: identifying, by a computing device, a graphical object from a first image to be displayed on the irregular surface; determining, by a computing device, a shape function for distorting the graphical object to compensate for irregularities in the irregular display surface; processing, by a computing device, a first distortion of the graphical object according to the shape function if a preprocessed instance of the first distortion is not available; accessing, by a computing device, a preprocessed instance of the first distortion if the preprocessed instance is available; and overlaying, by a computing device, the first distortion to an output image for display on the irregular surface In Example 17, the subject matter of Example 16 optionally includes, wherein processing the first distortion includes computationally representing the graphical object on a rectangular mesh composed of individual deformable elements.

In Example 18, the subject matter of Example 17 optionally includes, wherein the individual deformable elements are Lagrange parent elements.

In Example 19, the subject matter of any one or more of Examples 17-18 optionally include, wherein processing the first distortion includes transforming at least some of the individual deformable elements into irregular Lagrange elements based on application of the shape function.

In Example 20, the subject matter of any one or more of Examples 16-19 optionally include, wherein shape function is at least a second-order shape function.

In Example 21, the subject matter of any one or more of Examples 16-20 optionally include, further comprising: storing a database of preprocessed instances of objects, including the first distortion.

In Example 22, the subject matter of any one or more of Examples 16-21 optionally include, further comprising: determining a plurality of different additional shape functions for distorting the graphical object according to different additional positions for the graphical object to be displayed on the irregular surface.

In Example 23, the subject matter of any one or more of Examples 16-22 optionally include, further comprising: dividing the graphical object into a plurality of graphical objects in response to a degree of applied distortion exceeding a defined threshold.

In Example 24, the subject matter of any one or more of Examples 16-23 optionally include, further comprising: projecting the output image onto the irregular surface.

In Example 25, the subject matter of any one or more of Examples 16-24 optionally include, wherein the method is executed automatically by a wearable computing device.

In Example 26, the subject matter of any one or more of Examples 16-25 optionally include, wherein the method is executed by a smartphone.

Example 27 is at least one computer-readable medium comprising instructions that, when executed on computing hardware, cause the computing hardware to implement: a presenter module to identify a graphical object from an image to be displayed on the irregular surface; an object renderer module to distort objects according to at least one shape function, wherein distortion of the objects compensates for irregularities in the irregular surface; and an object overlay module to add previously-distorted instances of objects to a distortion-compensated image; wherein the presenter module is further to determine whether the graphical object is to be processed by the object renderer module prior to being processed by the object overlay module In Example 28, the subject matter of Example 27 optionally includes, wherein the instructions are further to cause the computing hardware to implement: a rectangular mesh renderer module to computationally represent objects on a rectangular mesh composed of individual deformable elements, wherein the presenter module is to pass the graphical object to the rectangular mesh renderer module.

In Example 29, the subject matter of any one or more of Examples 27-28 optionally include, wherein the individual deformable elements are Lagrange parent elements.

In Example 30, the subject matter of Example 29 optionally includes, wherein the object renderer module is to transform at least some of the individual deformable elements into irregular Lagrange elements based on application of at least one shape function.

In Example 31, the subject matter of any one or more of Examples 27-30 optionally include, wherein the instructions are further to cause the computing hardware to implement: a rendered object pool that includes a database of the previously-distorted instances of objects, the rendered object pool being responsive to queries identifying original objects and type of distortion applied to those original objects.

In Example 32, the subject matter of Example 31 optionally includes, wherein the rendered object pool is to store hashes of shape functions in association with objects to which those shape functions have been applied to distort those objects.

In Example 33, the subject matter of any one or more of Examples 27-32 optionally include, wherein the object renderer module is to apply a plurality of different shape functions to the graphical object, the plurality of different shape functions corresponding to a plurality of different positions for the graphical object to be displayed on the irregular surface.

In Example 34, the subject matter of any one or more of Examples 27-33 optionally include, wherein the object renderer module is to divide the graphical object into a plurality of graphical objects in response to a degree of applied distortion exceeding a defined threshold.

In Example 35, the subject matter of any one or more of Examples 27-34 optionally include, wherein the object renderer module is to apply a shape function to the graphical object that is at least a second-order shape function.

In Example 36, the subject matter of any one or more of Examples 27-35 optionally include, wherein the at least one computer-readable medium is incorporated as part of a wearable computing device.

In Example 37, the subject matter of any one or more of Examples 27-36 optionally include, wherein the at least one computer-readable medium is incorporated as part of a smartphone.

Example 38 is a system for producing an image on an irregular surface, the system comprising: means for identifying a graphical object from a first image to be displayed on the irregular surface; means for determining a shape function for distorting the graphical object to compensate for irregularities in the irregular display surface; means for processing a first distortion of the graphical object according to the shape function if a preprocessed instance of the first distortion is not available; means for accessing a preprocessed instance of the first distortion if the preprocessed instance is available; and means for overlaying the first distortion to an output image for display on the irregular surface In Example 39, the subject matter of Example 38 optionally includes, wherein the means for processing the first distortion includes means for computationally representing the graphical object on a rectangular mesh composed of individual deformable elements.

In Example 40, the subject matter of Example 39 optionally includes, wherein the individual deformable elements are Lagrange parent elements.

In Example 41, the subject matter of any one or more of Examples 39-40 optionally include, wherein the means for processing the first distortion includes means for transforming at least some of the individual deformable elements into irregular Lagrange elements based on application of the shape function.

In Example 42, the subject matter of any one or more of Examples 38-41 optionally include, wherein shape function is at least a second-order shape function.

In Example 43, the subject matter of any one or more of Examples 38-42 optionally include, further comprising: means for storing a database of preprocessed instances of objects, including the first distortion.

In Example 44, the subject matter of any one or more of Examples 38-43 optionally include, further comprising: means for determining a plurality of different additional shape functions for distorting the graphical object according to different additional positions for the graphical object to be displayed on the irregular surface.

In Example 45, the subject matter of any one or more of Examples 38-44 optionally include, further comprising: means for dividing the graphical object into a plurality of graphical objects in response to a degree of applied distortion exceeding a defined threshold.

In Example 46, the subject matter of any one or more of Examples 38-45 optionally include, further comprising: the means for projecting the output image onto the irregular surface.

In Example 47, the subject matter of any one or more of Examples 38-46 optionally include, wherein the system is part of a wearable computing device.

In Example 48, the subject matter of any one or more of Examples 38-47 optionally include, wherein the system is part of a smartphone.

In Example 49, a system for producing an image on an irregular surface includes means for performing the subject matter according to any one of Examples 16-26.

In Example 50, at least one computer-readable medium contains instructions that, when executed on a computing system, cause the computing system to execute the subject matter according to any one of Examples 16-26.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for producing an image on an irregular surface, the system comprising:
    a presenter module to identify a graphical object from an image to be displayed on the irregular surface;
    an object renderer module to distort objects according to at least one shape function, wherein distortion of the objects compensates for irregularities in the irregular surface; and
    an object overlay module to add previously-distorted instances of objects to a distortion-compensated image;
    wherein the presenter module is further to determine whether the graphical object is to be processed by the object renderer module prior to being processed by the object overlay module; and
    wherein the presenter module, the object renderer module, the object overlay module, and the presenter module are each a hardware-based module.

2. The system of claim 1, further comprising:
    computing hardware, including a processor, a data store, and input/output facilities, data store containing instructions that, when executed, cause the computing hardware to implement the presenter module, the object renderer module, and the object overlay module.

3. The system of claim 1, wherein at least one of the presenter module, the object renderer module, and the object overlay module, is implemented in hard-wired logic.

4. The system of claim 1, further comprising:
    a rectangular mesh renderer module to computationally represent objects on a rectangular mesh composed of individual deformable elements, wherein the presenter module is to pass the graphical object to the rectangular mesh renderer module, and
    wherein the rectangular mesh renderer module is a hardware-based module.

5. The system of claim 4, wherein the object renderer module is to transform at least some of the individual deformable elements into irregular Lagrange elements based on application of at least one shape function.

6. The system of claim 1, further comprising:
    a rendered object pool that includes a database of the previously-distorted instances of objects, the rendered object pool being responsive to queries identifying original objects and type of distortion applied to those original objects.

7. The system of claim 6, wherein the rendered object pool is to store hashes of shape functions in association with objects to which those shape functions have been applied to distort those objects.

8. The system of claim 1, wherein the object renderer module is to apply a plurality of different shape functions to the graphical object, the plurality of different shape functions corresponding to a plurality of different positions for the graphical object to be displayed on the irregular surface.

9. The system of claim 1, wherein the object renderer module is to divide the graphical object into a plurality of graphical objects in response to a degree of applied distortion exceeding a defined threshold.

10. The system of claim 1, wherein the object renderer module is to apply a shape function to the graphical object that is at least a second-order shape function.

11. The system of claim 1, wherein the system further comprises a display projector arranged to project the image onto the irregular surface.

12. A method for producing an image on an irregular surface, the method comprising:
    identifying, by a computing device, a graphical object from a first image to be displayed on the irregular surface;
    determining, by a computing device, a shape function for distorting the graphical object to compensate for irregularities in the irregular display surface;
    processing, by a computing device, a first distortion of the graphical object according to the shape function if a preprocessed instance of the first distortion is not available;
    accessing, by a computing device, a preprocessed instance of the first distortion if the preprocessed instance is available; and
    overlaying, by a computing device, the first distortion to an output image for display on the irregular surface.

13. The method of claim 12, wherein processing the first distortion includes computationally representing the graphical object on a rectangular mesh composed of individual deformable elements.

14. The method of claim 13, wherein processing the first distortion includes transforming at least some of the individual deformable elements into irregular Lagrange elements based on application of the shape function.

15. The method of claim 12, wherein shape function is at least a second-order shape function.

16. The method of claim 12, further comprising:
    storing a database of preprocessed instances of objects, including the first distortion.

17. The method of claim 12, further comprising:
    determining a plurality of different additional shape functions for distorting the graphical object according to different additional positions for the graphical object to be displayed on the irregular surface.

18. The method of claim 12, further comprising:
    dividing the graphical object into a plurality of graphical objects in response to a degree of applied distortion exceeding a defined threshold.

19. The method of claim 12, further comprising:
    projecting the output image onto the irregular surface.

20. The method of claim 12, wherein the method is executed automatically by a wearable computing device.

21. At least one non-transitory computer-readable medium comprising instructions that, when executed on computing hardware, cause the computing hardware to:
    identify a graphical object from an image to be displayed on the irregular surface;
    distort objects according to at least one shape function, wherein distortion of the objects compensates for irregularities in the irregular surface; and
    add previously-distorted instances of objects to a distortion-compensated image;
    determine whether the graphical object is to be distorted according to at least one shape function prior to having previously-distorted instances of objects added to a distortion-compensated image.

22. The at least one computer-readable medium of claim 21, wherein the individual deformable elements are Lagrange parent elements.

23. The at least one computer-readable medium of claim 22, wherein the distortion of objects according to the at least one shape function is to transform at least some of the individual deformable elements into irregular Lagrange elements based on application of at least one shape function.

24. The at least one computer-readable medium of claim 21, wherein the instructions are further to cause the computing hardware to implement:
- a rendered object pool that includes a database of the previously-distorted instances of objects, the rendered object pool being responsive to queries identifying original objects and type of distortion applied to those original objects.

25. The at least one computer-readable medium of claim 21, wherein the distortion of objects according to the at least one shape function is to apply a plurality of different shape functions to the graphical object, the plurality of different shape functions corresponding to a plurality of different positions for the graphical object to be displayed on the irregular surface.

26. The at least one computer-readable medium of claim 21, wherein the distortion of objects according to the at least one shape function is to apply a shape function to the graphical object that is at least a second-order shape function.

* * * * *

UNITED STATES PATENT AND TRADEMARK OFFICE
CERTIFICATE OF CORRECTION

PATENT NO. : 9,881,405 B2
APPLICATION NO. : 14/757868
DATED : January 30, 2018
INVENTOR(S) : Fai Yeung It is certified that error appears in the above-identified patent and that said Letters Patent is hereby corrected as shown below:

On the Title Page

Item (56), in Column 2, under "Other Publications", Line 7, after "1484-1491.", insert
--¶"International Application Serial No. PCT/US2016/061376, International Search Report mailed Feb. 20, 2017", 3 pgs.--

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*